(12) United States Patent
Cheung

(10) Patent No.: US 12,145,348 B2
(45) Date of Patent: Nov. 19, 2024

(54) SYSTEM FOR FORMING A ROOFING MEMBRANE, AND ASSOCIATED METHOD

(71) Applicant: GAF Energy LLC, Parsippany, NJ (US)

(72) Inventor: Caleb David Cheung, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/455,129

(22) Filed: Aug. 24, 2023

(65) Prior Publication Data

US 2024/0066853 A1 Feb. 29, 2024

Related U.S. Application Data

(60) Provisional application No. 63/400,646, filed on Aug. 24, 2022.

(51) Int. Cl.
*B32B 37/06* (2006.01)
*B32B 27/08* (2006.01)
(Continued)

(52) U.S. Cl.
CPC ............ *B32B 37/203* (2013.01); *B32B 27/08* (2013.01); *B32B 27/32* (2013.01); *B32B 37/06* (2013.01);
(Continued)

(58) Field of Classification Search
CPC ....... B32B 37/203; B32B 27/08; B32B 27/32; B32B 37/06; B32B 37/10; B32B 38/0004;
(Continued)

(56) References Cited

U.S. PATENT DOCUMENTS 1,981,467 A 11/1934 Radtke
3,156,497 A 11/1964 Lessard
(Continued)

FOREIGN PATENT DOCUMENTS

CA 2829440 A 5/2019
CH 700095 A2 6/2010
(Continued)

OTHER PUBLICATIONS

English machine translation of SE 506334 C2; Haellewall; 11 pages; Jun. 1996. (Year: 1996).*
(Continued)

*Primary Examiner* — Linda L Gray
(74) *Attorney, Agent, or Firm* — GREENBERG TRAURIG, LLP

(57) ABSTRACT

A method includes obtaining a first roll of a first sheet comprising thermoplastic polyolefin and having a width of at least 60 inches; obtaining a second roll of a second sheet comprising thermoplastic polyolefin and having a width of at least 60 inches; heating at least a portion of a width of the first sheet with hot air from a hot air knife to form a heated first sheet; and compressing the heated first sheet and the second sheet between two rollers, to form a laminated roofing membrane, where the heated first sheet and the second sheet directly contact one another without a scrim layer disposed between the heated first sheet and the second sheet.

15 Claims, 4 Drawing Sheets

(51) Int. Cl.
  *B32B 27/32* (2006.01)
  *B32B 37/10* (2006.01)
  *B32B 37/20* (2006.01)
  *B32B 38/00* (2006.01)
  *B32B 38/06* (2006.01)
  *E04D 5/06* (2006.01)
  *E04D 5/10* (2006.01)

(52) U.S. Cl.
  CPC .......... *B32B 37/10* (2013.01); *B32B 38/0004* (2013.01); *B32B 38/06* (2013.01); *E04D 5/06* (2013.01); *E04D 5/10* (2013.01); *B32B 2250/02* (2013.01); *B32B 2250/03* (2013.01); *B32B 2250/242* (2013.01); *B32B 2323/00* (2013.01); *B32B 2419/06* (2013.01)

(58) Field of Classification Search
  CPC . B32B 38/06; B32B 2250/02; B32B 2250/03; B32B 2250/242; B32B 2323/00; B32B 2419/06; E04D 5/06; E04D 5/10
  See application file for complete search history.

(56) References Cited

U.S. PATENT DOCUMENTS

| | | | |
|---|---|---|---|
| 3,387,420 A * | 6/1968 | Long | E04D 5/12 |
| | | | 428/167 |
| 3,581,779 A | 6/1971 | Gilbert, Jr. | |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,167,579 A | 12/1992 | Rotter | |
| 5,437,735 A | 8/1995 | Younan et al. | |
| 5,590,495 A | 1/1997 | Bressler et al. | |
| 5,642,596 A | 7/1997 | Waddington | |
| 6,008,450 A | 12/1999 | Ohtsuka et al. | |
| 6,033,270 A | 3/2000 | Stuart | |
| 6,046,399 A | 4/2000 | Kapner | |
| 6,201,180 B1 | 3/2001 | Meyer et al. | |
| 6,220,329 B1 | 4/2001 | King et al. | |
| 6,308,482 B1 | 10/2001 | Strait | |
| 6,320,114 B1 | 11/2001 | Kuechler | |
| 6,320,115 B1 | 11/2001 | Kataoka et al. | |
| 6,336,304 B1 | 1/2002 | Mimura et al. | |
| 6,341,454 B1 | 1/2002 | Koleoglou | |
| 6,407,329 B1 | 6/2002 | Tino et al. | |
| 6,576,830 B2 | 6/2003 | Nagao et al. | |
| 6,928,781 B2 | 8/2005 | Desbois et al. | |
| 6,972,066 B2 * | 12/2005 | Ishikawa | B41J 31/00 |
| | | | 156/271 |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,776,455 B2 | 7/2014 | Azoulay | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,153,950 B2 | 10/2015 | Yamanaka et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rordigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,412,890 B1 | 8/2016 | Meyers | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,156,075 B1 | 12/2018 | McDonough | |
| 10,187,005 B2 | 1/2019 | Rodrigues et al. | |
| 10,256,765 B2 | 4/2019 | Rodrigues et al. | |
| 10,284,136 B1 | 5/2019 | Mayfield et al. | |
| 10,454,408 B2 | 10/2019 | Livsey et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,579,028 B1 | 3/2020 | Jacob | |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,177,639 B1 | 11/2021 | Nguyen et al. | |

(56) References Cited

U.S. PATENT DOCUMENTS

| | | |
|---|---|---|
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0051805 A1* | 3/2003 | Mlinar ............... A61F 13/565 156/269 |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2004/0244316 A1* | 12/2004 | Macuga ............... C09J 7/22 52/198 |
| 2005/0030187 A1 | 2/2005 | Peress et al. |
| 2005/0053745 A1* | 3/2005 | Bartek ............... B32B 11/00 428/41.5 |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0111504 A1* | 5/2012 | Hamlin, III ............... E04D 5/10 156/383 |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pisikak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0154449 A1* | 6/2014 | Peng ............... E04D 5/06 428/41.3 |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |

(56) References Cited

U.S. PATENT DOCUMENTS

| | | |
|---|---|---|
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | | |
|---|---|---|---|
| CN | 202797032 U | 3/2013 | |
| CN | 217150978 U | 8/2022 | |
| DE | 1958248 A1 | 11/1971 | |
| EP | 1039361 A1 | 9/2000 | |
| EP | 1837162 A1 | 9/2007 | |
| EP | 1774372 A1 | 7/2011 | |
| EP | 2446481 A2 | 5/2012 | |
| EP | 2784241 A1 | 10/2014 | |
| EP | 3772175 A1 | 2/2021 | |
| JP | 10046767 A | 2/1998 | |
| JP | 2002-106151 A | 4/2002 | |
| JP | 2001-098703 A | 10/2002 | |
| JP | 2017-027735 A | 2/2017 | |
| JP | 2018053707 A | 4/2018 | |
| KR | 20090084060 A | 8/2009 | |
| KR | 10-1348283 B1 | 1/2014 | |
| KR | 10-2019-0000367 A | 1/2019 | |
| KR | 10-2253483 B1 | 5/2021 | |
| NL | 2026856 B1 | 6/2022 | |
| WO | 2010/151777 A2 | 12/2010 | |
| WO | 2011/049944 A1 | 4/2011 | |
| WO | 2015/133632 A1 | 9/2015 | |
| WO | WO2015164852 A1 * | 10/2015 | E04D 5/06 |
| WO | 2018/000589 A1 | 1/2018 | |
| WO | 2019/201416 A1 | 10/2019 | |
| WO | 2020-159358 A1 | 8/2020 | |
| WO | 2021-247098 A1 | 12/2021 | |

OTHER PUBLICATIONS

English machine translation of CA-2632824-A1; Hughes; 25 pages; Apr. 2009. (Year: 2009).*

Sunflare, Procducts: "Sunflare Develops Prototype For New Residential Solar Shingles": 2019 <<sunflaresolar.com/news/sunflare-develops-prototype-for-new-residential-solar-shingles>> retrieved Feb. 2, 2021.

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

SYSTEM FOR FORMING A ROOFING MEMBRANE, AND ASSOCIATED METHOD

CROSS-REFERENCE TO RELATED APPLICATION

This application claims priority to U.S. provisional application Ser. No. 63/400,646, titled "SYSTEM FOR FORMING A ROOFING MEMBRANE, AND ASSOCIATED METHOD," filed Aug. 24, 2022, the disclosure of which is incorporated by reference herein in its entirety.

FIELD OF THE INVENTION

The disclosure relates to a roofing membrane, and, more particularly, to a laminated roofing membrane.

BACKGROUND

Generally, asphalt shingles are used to cover a steep slope roof deck, while roofing membranes, such as a roofing membrane made of thermoplastic polyolefin (TPO), are used to cover a flat roof.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

In some embodiments, a method comprises obtaining a first roll of a first sheet, wherein the first sheet comprises thermoplastic polyolefin (TPO), and wherein the first sheet has a width of at least 60 inches measured parallel to an axis of the first roll of the first sheet; obtaining a second roll of a second sheet, wherein the second sheet comprises thermoplastic polyolefin (TPO), and wherein the second sheet has a width of at least 60 inches measured parallel to an axis of the second roll of the second sheet; heating, in a heating zone, at least a portion of a width of the first sheet with hot air from a hot air knife to form a heated first sheet; and compressing, in a compressing zone, the heated first sheet and the second sheet between two rollers, thereby to form a laminated roofing membrane, wherein the heated first sheet and the second sheet directly contact one another without a scrim layer disposed between the heated first sheet and the second sheet, and wherein the hot air knife is adjacent to the two rollers.

In some embodiments, the hot air knife provides a continuous weld of the first and second sheets.

In some embodiments, the hot air knife heats an entire width of the first sheet.

In some embodiments, the hot air knife heats the entire width of the first sheet with air at a temperature of at least 600° C.

In some embodiments, the hot air knife does not heat an entire width of the first sheet.

In some embodiments, the heating further comprises heating, in the heating zone, at least a portion of a width of the second sheet with hot air from the hot air knife to form a heated second sheet.

In some embodiments, the compressing further comprises compressing, in the compressing zone, the heated first sheet and the heated second sheet between the two rollers, thereby to form the laminated roofing membrane.

In some embodiments, the hot air knife heats an entire width of the second sheet.

In some embodiments, the hot air knife heats the entire width of the second sheet with air at a temperature of at least 600° C.

In some embodiments, the hot air knife does not heat an entire width of the second sheet.

In some embodiments, the widths of the first and second sheets are the same.

In some embodiments, the widths of the first and second sheets are the same, and the widths are 60 inches to 120 inches.

In some embodiments, the widths of the first and second sheets are the same, and the widths are 60 inches.

In some embodiments, a thickness of the first and second sheets are the same.

In some embodiments, the thickness of the first sheet is different than the thickness of the second sheet.

In some embodiments, at least one of the first and second sheets has a thickness of 80 mils.

In some embodiments, each of the first and second sheets has a thickness of 80 mils.

In some embodiments, the method further comprises cutting the laminated roofing membrane, thereby to form a first laminated roofing strip.

In some embodiments, the first laminated roofing strip has a length of 18 inches.

In some embodiments, the first laminated roofing strip has a width of 60 inches.

In some embodiments, the method further comprises cutting the laminated roofing membrane, thereby to form a plurality of laminated roofing strips.

In some embodiments, the method further comprises reheating the laminated roofing membrane; and texturing the reheated laminated roofing membrane.

In some embodiments, the method further comprises texturing the laminated roofing membrane without reheating the laminated roofing membrane.

In some embodiments, the texturing comprises using at least one texturing roller to texture the laminated roofing membrane, thereby to form a textured laminated roofing membrane.

In some embodiments, the texturing comprises using two texturing rollers to texture the laminated roofing membrane, thereby to form the textured laminated roofing membrane.

In some embodiments, the method further comprises cutting the textured laminated roofing membrane, thereby to form a first textured laminated roofing strip.

In some embodiments, the first textured laminated roofing strip has a length of 18 inches.

In some embodiments, the first textured laminated roofing strip has a width of 60 inches.

In some embodiments, the method further comprises cutting the textured laminated roofing membrane, thereby to form a plurality of textured laminated roofing strips.

In some embodiments, neither the first nor second sheet is heated prior to the heating with the hot air knife.

In some embodiments, the laminated roofing membrane excludes any extruded material.

In some embodiments, rotation of the two rollers used to compress the first and second sheets pulls the first sheet and the second sheet through the heating zone and the compressing zone.

In some embodiments, there is no adhesive between the first sheet and the second sheet.

In some embodiments, the method further comprises obtaining a third roll of a third sheet, wherein the third sheet comprises thermoplastic polyolefin (TPO), and wherein the third sheet has a width of at least 60 inches measured parallel to an axis of the third roll of the third sheet; and the compressing further comprises compressing, in the compressing zone, the heated first sheet, the second sheet, and the third sheet between the two rollers, thereby to form the laminated roofing membrane.

In some embodiments, the method further comprises obtaining a third roll of a third sheet, wherein the third sheet comprises thermoplastic polyolefin (TPO), and wherein the third sheet has a width of at least 60 inches measured parallel to an axis of the third roll of the third sheet; and compressing, in a second compressing zone, the laminated roofing membrane and the third sheet between a second set of two rollers, thereby to form a three-layer laminated roofing membrane, wherein the laminated roofing membrane and the third sheet directly contact one another without a scrim layer disposed between the laminated roofing membrane and the third sheet.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
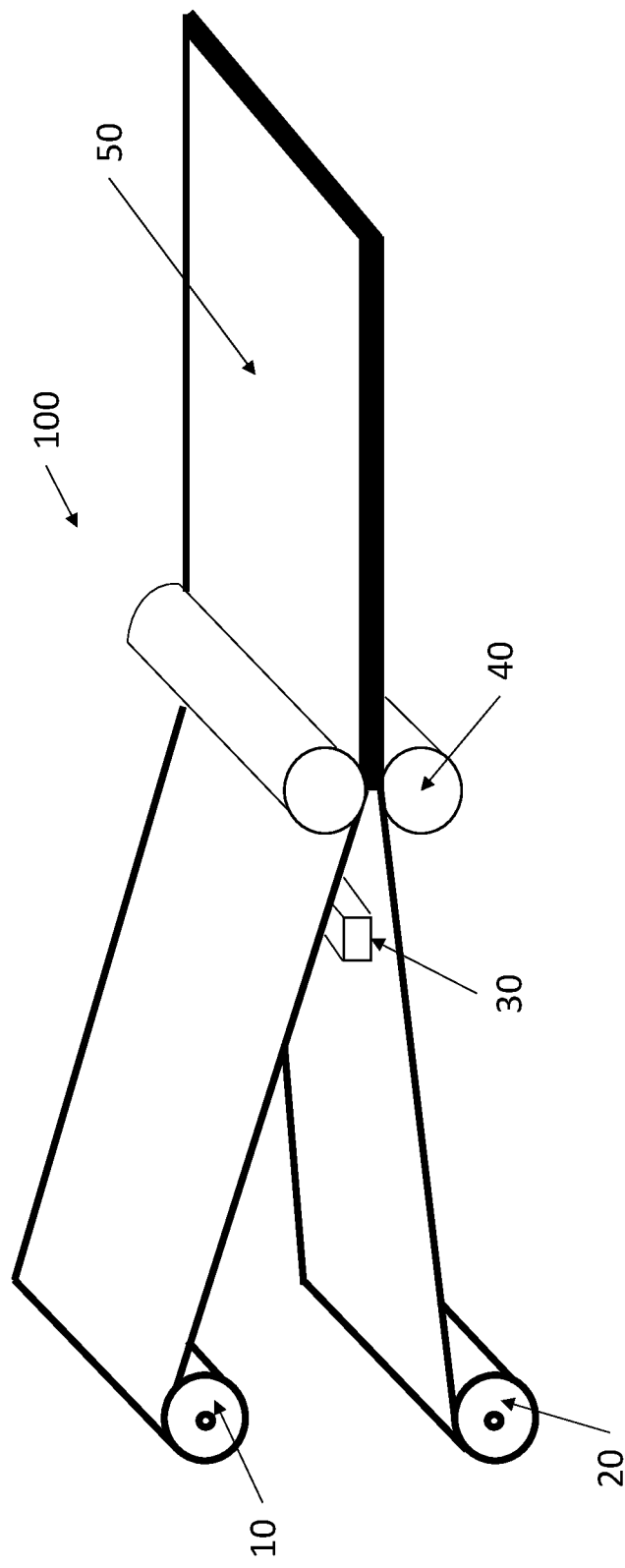
FIG. 1 is an isometric view of a system in accordance with some embodiments of the invention.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising" "including," "having," and any similar phrase, do not limit the scope of a specific claim to the materials or steps recited by the claim.

In accordance with the discussion herein, in some embodiments, a method includes obtaining a first roll of a first sheet, obtaining a second roll of a second sheet, heating, in a heating zone, at least a portion of a width of the first sheet with hot air from a hot air knife to form a heated first sheet, and compressing, in a compressing zone, the heated first sheet and the second sheet between a first set of two compressing rollers, thereby to form a laminated roofing membrane, wherein the heated first sheet and the second sheet directly contact one another without a scrim layer disposed between the heated first sheet and the second sheet, and wherein the hot air knife is adjacent to the two compressing rollers.

In some embodiments, a portion of the width of the sheet which is heated is 1% to 99% of the width. In some embodiments, the portion of the width of the sheet which is heated is 5% to 99% of the width. In some embodiments, the portion of the width of the sheet which is heated is 10% to 99% of the width. In some embodiments, the portion of the width of the sheet which is heated is 20% to 99% of the width. In some embodiments, the portion of the width of the sheet which is heated is 30% to 99% of the width. In some embodiments, the portion of the width of the sheet which is heated is 40% to 99% of the width. In some embodiments, the portion of the width of the sheet which is heated is 50% to 99% of the width. In some embodiments, the portion of the width of the sheet which is heated is 60% to 99% of the width. In some embodiments, the portion of the width of the sheet which is heated is 70% to 99% of the width. In some embodiments, the portion of the width of the sheet which is heated is 80% to 99% of the width. In some embodiments, the portion of the width of the sheet which is heated is 90% to 99% of the width. In some embodiments, the portion of the width of the sheet which is heated is 95% to 99% of the width.

In some embodiments, the portion of the width of the sheet which is heated is 1% to 95% of the width. In some embodiments, the portion of the width of the sheet which is heated is 5% to 95% of the width. In some embodiments, the portion of the width of the sheet which is heated is 10% to 95% of the width. In some embodiments, the portion of the width of the sheet which is heated is 20% to 95% of the width. In some embodiments, the portion of the width of the sheet which is heated is 30% to 95% of the width. In some embodiments, the portion of the width of the sheet which is heated is 40% to 95% of the width. In some embodiments, the portion of the width of the sheet which is heated is 50% to 95% of the width. In some embodiments, the portion of the width of the sheet which is heated is 60% to 95% of the width. In some embodiments, the portion of the width of the sheet which is heated is 70% to 95% of the width. In some embodiments, the portion of the width of the sheet which is heated is 80% to 95% of the width. In some embodiments, the portion of the width of the sheet which is heated is 90% to 95% of the width.

In some embodiments, the portion of the width of the sheet which is heated is 1% to 90% of the width. In some embodiments, the portion of the width of the sheet which is heated is 5% to 90% of the width. In some embodiments, the portion of the width of the sheet which is heated is 10% to 90% of the width. In some embodiments, the portion of the width of the sheet which is heated is 20% to 90% of the width. In some embodiments, the portion of the width of the sheet which is heated is 30% to 90% of the width. In some embodiments, the portion of the width of the sheet which is heated is 40% to 90% of the width. In some embodiments, the portion of the width of the sheet which is heated is 50% to 90% of the width. In some embodiments, the portion of the width of the sheet which is heated is 60% to 90% of the width. In some embodiments, the portion of the width of the sheet which is heated is 70% to 90% of the width. In some embodiments, the portion of the width of the sheet which is heated is 80% to 90% of the width.

In some embodiments, the portion of the width of the sheet which is heated is 1% to 80% of the width. In some embodiments, the portion of the width of the sheet which is heated is 5% to 80% of the width. In some embodiments, the portion of the width of the sheet which is heated is 10% to 80% of the width. In some embodiments, the portion of the width of the sheet which is heated is 20% to 80% of the width. In some embodiments, the portion of the width of the sheet which is heated is 30% to 80% of the width. In some embodiments, the portion of the width of the sheet which is heated is 40% to 80% of the width. In some embodiments, the portion of the width of the sheet which is heated is 50% to 80% of the width. In some embodiments, the portion of the width of the sheet which is heated is 60% to 80% of the width. In some embodiments, the portion of the width of the sheet which is heated is 70% to 80% of the width.

In some embodiments, the portion of the width of the sheet which is heated is 1% to 70% of the width. In some embodiments, the portion of the width of the sheet which is heated is 5% to 70% of the width. In some embodiments, the portion of the width of the sheet which is heated is 10% to 70% of the width. In some embodiments, the portion of the width of the sheet which is heated is 20% to 70% of the width. In some embodiments, the portion of the width of the sheet which is heated is 30% to 70% of the width. In some embodiments, the portion of the width of the sheet which is heated is 40% to 70% of the width. In some embodiments, the portion of the width of the sheet which is heated is 50% to 70% of the width. In some embodiments, the portion of the width of the sheet which is heated is 60% to 70% of the width.

In some embodiments, the portion of the width of the sheet which is heated is 1% to 60% of the width. In some embodiments, the portion of the width of the sheet which is heated is 5% to 60% of the width. In some embodiments, the portion of the width of the sheet which is heated is 10% to 60% of the width. In some embodiments, the portion of the width of the sheet which is heated is 20% to 60% of the width. In some embodiments, the portion of the width of the sheet which is heated is 30% to 60% of the width. In some embodiments, the portion of the width of the sheet which is heated is 40% to 60% of the width. In some embodiments, the portion of the width of the sheet which is heated is 50% to 60% of the width.

In some embodiments, the portion of the width of the sheet which is heated is 1% to 50% of the width. In some embodiments, the portion of the width of the sheet which is heated is 5% to 50% of the width. In some embodiments, the portion of the width of the sheet which is heated is 10% to 50% of the width. In some embodiments, the portion of the width of the sheet which is heated is 20% to 50% of the width. In some embodiments, the portion of the width of the sheet which is heated is 30% to 50% of the width. In some embodiments, the portion of the width of the sheet which is heated is 40% to 50% of the width.

In some embodiments, the portion of the width of the sheet which is heated is 1% to 40% of the width. In some embodiments, the portion of the width of the sheet which is heated is 5% to 40% of the width. In some embodiments, the portion of the width of the sheet which is heated is 10% to 40% of the width. In some embodiments, the portion of the width of the sheet which is heated is 20% to 40% of the width. In some embodiments, the portion of the width of the sheet which is heated is 30% to 40% of the width.

In some embodiments, the portion of the width of the sheet which is heated is 1% to 30% of the width. In some embodiments, the portion of the width of the sheet which is heated is 5% to 30% of the width. In some embodiments, the portion of the width of the sheet which is heated is 10% to 30% of the width. In some embodiments, the portion of the width of the sheet which is heated is 20% to 30% of the width.

In some embodiments, the portion of the width of the sheet which is heated is 1% to 20% of the width. In some embodiments, the portion of the width of the sheet which is heated is 5% to 20% of the width. In some embodiments, the portion of the width of the sheet which is heated is 10% to 20% of the width.

In some embodiments, the portion of the width of the sheet which is heated is 1% to 10% of the width. In some embodiments, the portion of the width of the sheet which is heated is 5% to 10% of the width. In some embodiments, the portion of the width of the sheet which is heated is 1% to 5% of the width.

In some embodiments, either or both of the first roll of the first sheet and/or the second roll of the second sheet may be rolled around a center roll that is separate from the first and/or second sheets. In some embodiments, either or both of the first roll of the first sheet and/or the second roll of the second sheet may be rolled around a carboard center roll. In some embodiments, either or both of the first roll of the first sheet and/or the second roll of the second sheet may be rolled around a center roll formed of another material. In some embodiments, either or both of the first roll of the first sheet and/or the second roll of the second sheet may not be rolled around a separate center roll.

In some embodiments, a material of either or both of the first sheet and/or the second sheet may be thermoplastic polyolefin (TPO). In some embodiments, the material of either or both of the first sheet and/or the second sheet may be polyvinyl chloride (PVC). In some embodiments, the material of either or both of the first sheet and/or the second sheet may be Styrene-Butadiene-Styrene (SBS) modified bitumen. In some embodiments, the material of either or both of the first sheet and/or the second sheet may be polymethylmethacrylate (PMMA). In some embodiments, the material of either or both of the first sheet and/or the second sheet may be any combination of the above materials.

In some embodiments, either or both of the first sheet and/or the second sheet may be 50 feet in the longest dimension (that is, 50 feet in length), wherein the length is the dimension measured perpendicular to an axis of the roll. In some embodiments, either or both of the first sheet and/or the second sheet may be 100 feet in length. In some embodiments, either or both of the first sheet and/or the second sheet may be 50 feet to 100 feet in length.

In some embodiments, either or both of the first sheet and/or the second sheet may be 60 inches (5 feet) in the next longest direction (that is, 60 inches in width), wherein the width is the dimension measured parallel to the axis of the roll. In some embodiments, either or both of the first sheet and/or the second sheet may be at least 60 inches (that is, 5 feet) in width. In some embodiments, either or both of the first sheet and/or the second sheet may be 120 inches (that is, 10 feet) in width. In some embodiments, either or both of the first sheet and/or the second sheet may be 144 inches (that is, 12 feet) in width. In some embodiments, either or both of the first sheet and/or the second sheet may be 5 to 12 feet in width. In some embodiments, either or both of the first sheet and/or the second sheet may be 5 to 10 feet in width. In some embodiments, either or both of the first sheet and/or the second sheet may be 10 to 12 feet in width.

In some embodiments, either or both of the first sheet and/or the second sheet may have a thickness of 100 mil. In some embodiments, either or both of the first sheet and/or the second sheet may have a thickness of 90 mil. In some embodiments, either or both of the first sheet and/or the second sheet may have a thickness of 85 mil. In some embodiments, either or both of the first sheet and/or the second sheet may have a thickness of 80 mil. In some embodiments, either or both of the first sheet and/or the second sheet may have a thickness of 75 mil. In some embodiments, either or both of the first sheet and/or the second sheet may have a thickness of 70 mil. In some embodiments, either or both of the first sheet and/or the second sheet may have a thickness of 65 mil. In some embodiments, either or both of the first sheet and/or the second sheet may have a thickness of 60 mil. In some embodiments, either or both of the first sheet and/or the second sheet may have a thickness of 55 mil. In some embodiments, either or both of the first sheet and/or the second sheet may have a thickness of 50 mil. In some embodiments, either or both of the first sheet and/or the second sheet may have a thickness of 45 mil. In some embodiments, either or both of the first sheet and/or the second sheet may have a thickness of 45 mil.

In some embodiments, either or both of the first sheet and/or the second sheet may have a thickness more than 100 mil. In some embodiments, either or both of the first sheet and/or the second sheet may have a thickness more than 90 mil. In some embodiments, either or both of the first sheet and/or the second sheet may have a thickness more than 85 mil. In some embodiments, either or both of the first sheet and/or the second sheet may have a thickness more than 80 mil. In some embodiments, either or both of the first sheet and/or the second sheet may have a thickness more than 75 mil. In some embodiments, either or both of the first sheet and/or the second sheet may have a thickness more than 70 mil. In some embodiments, either or both of the first sheet and/or the second sheet may have a thickness more than 65 mil. In some embodiments, either or both of the first sheet and/or the second sheet may have a thickness more than 60 mil. In some embodiments, either or both of the first sheet and/or the second sheet may have a thickness more than 55 mil. In some embodiments, either or both of the first sheet and/or the second sheet may have a thickness more than 50 mil. In some embodiments, either or both of the first sheet and/or the second sheet may have a thickness more than 45 mil. In some embodiments, either or both of the first sheet and/or the second sheet may have a thickness more than 45 mil.

In some embodiments, either or both of the first sheet and/or the second sheet may have a thickness less than 100 mil. In some embodiments, either or both of the first sheet and/or the second sheet may have a thickness less than 90 mil. In some embodiments, either or both of the first sheet and/or the second sheet may have a thickness less than 85 mil. In some embodiments, either or both of the first sheet and/or the second sheet may have a thickness less than 80 mil. In some embodiments, either or both of the first sheet and/or the second sheet may have a thickness less than 75 mil. In some embodiments, either or both of the first sheet and/or the second sheet may have a thickness less than 70 mil. In some embodiments, either or both of the first sheet and/or the second sheet may have a thickness less than 65 mil. In some embodiments, either or both of the first sheet and/or the second sheet may have a thickness less than 60 mil. In some embodiments, either or both of the first sheet and/or the second sheet may have a thickness less than 55 mil. In some embodiments, either or both of the first sheet and/or the second sheet may have a thickness less than 50 mil. In some embodiments, either or both of the first sheet and/or the second sheet may have a thickness less than 45 mil. In some embodiments, either or both of the first sheet and/or the second sheet may have a thickness less than 45 mil.

In some embodiments, either or both of the first sheet and/or the second sheet may have a thickness of 40 mil to 100 mil. In some embodiments, either or both of the first sheet and/or the second sheet may have a thickness of 45 mil to 100 mil. In some embodiments, either or both of the first sheet and/or the second sheet may have a thickness of 50 mil to 100 mil. In some embodiments, either or both of the first sheet and/or the second sheet may have a thickness of 55 mil to 100 mil. In some embodiments, either or both of the first sheet and/or the second sheet may have a thickness of 60 mil to 100 mil. In some embodiments, either or both of the first sheet and/or the second sheet may have a thickness of 65 mil to 100 mil. In some embodiments, either or both of the first sheet and/or the second sheet may have a thickness of 70 mil to 100 mil. In some embodiments, either or both of the first sheet and/or the second sheet may have a thickness of 75 mil to 100 mil. In some embodiments, either or both of the first sheet and/or the second sheet may have a thickness of 80 mil to 100 mil. In some embodiments, either or both of the first sheet and/or the second sheet may have a thickness of 85 mil to 100 mil. In some embodiments, either or both of the first sheet and/or the second sheet may have a thickness of 90 mil to 100 mil.

In some embodiments, either or both of the first sheet and/or the second sheet may have a thickness of 40 mil to 90 mil. In some embodiments, either or both of the first sheet and/or the second sheet may have a thickness of 45 mil to 90 mil. In some embodiments, either or both of the first sheet and/or the second sheet may have a thickness of 50 mil to 90 mil. In some embodiments, either or both of the first sheet and/or the second sheet may have a thickness of 55 mil to 90 mil. In some embodiments, either or both of the first sheet and/or the second sheet may have a thickness of 60 mil to 90 mil. In some embodiments, either or both of the first sheet and/or the second sheet may have a thickness of 65 mil to 90 mil. In some embodiments, either or both of the first sheet and/or the second sheet may have a thickness of 70 mil to 90 mil. In some embodiments, either or both of the first sheet and/or the second sheet may have a thickness of 75 mil to 90 mil. In some embodiments, either or both of the first sheet and/or the second sheet may have a thickness of 80 mil to 90 mil. In some embodiments, either or both of the first sheet and/or the second sheet may have a thickness of 85 mil to 90 mil.

In some embodiments, either or both of the first sheet and/or the second sheet may have a thickness of 40 mil to 85 mil. In some embodiments, either or both of the first sheet and/or the second sheet may have a thickness of 45 mil to 85 mil. In some embodiments, either or both of the first sheet and/or the second sheet may have a thickness of 50 mil to 85 mil. In some embodiments, either or both of the first sheet and/or the second sheet may have a thickness of 55 mil to 85 mil. In some embodiments, either or both of the first sheet and/or the second sheet may have a thickness of 60 mil to 85 mil. In some embodiments, either or both of the first sheet and/or the second sheet may have a thickness of 65 mil to 85 mil. In some embodiments, either or both of the first sheet and/or the second sheet may have a thickness of 70 mil to 85 mil. In some embodiments, either or both of the first sheet and/or the second sheet may have a thickness of 75 mil to 85 mil. In some embodiments, either or both of the first sheet and/or the second sheet may have a thickness of 80 mil to 85 mil.

In some embodiments, either or both of the first sheet and/or the second sheet may have a thickness of 40 mil to 80 mil. In some embodiments, either or both of the first sheet and/or the second sheet may have a thickness of 45 mil to 80 mil. In some embodiments, either or both of the first sheet and/or the second sheet may have a thickness of 50 mil to 80 mil. In some embodiments, either or both of the first sheet and/or the second sheet may have a thickness of 55 mil to 80 mil. In some embodiments, either or both of the first sheet and/or the second sheet may have a thickness of 60 mil to 80 mil. In some embodiments, either or both of the first sheet and/or the second sheet may have a thickness of 65 mil to 80 mil. In some embodiments, either or both of the first sheet and/or the second sheet may have a thickness of 70 mil to 80 mil. In some embodiments, either or both of the first sheet and/or the second sheet may have a thickness of 75 mil to 80 mil.

In some embodiments, either or both of the first sheet and/or the second sheet may have a thickness of 40 mil to 75 mil. In some embodiments, either or both of the first sheet and/or the second sheet may have a thickness of 45 mil to 75 mil. In some embodiments, either or both of the first sheet and/or the second sheet may have a thickness of 50 mil to 75 mil. In some embodiments, either or both of the first sheet and/or the second sheet may have a thickness of 55 mil to 75 mil. In some embodiments, either or both of the first sheet and/or the second sheet may have a thickness of 60 mil to 75 mil. In some embodiments, either or both of the first sheet and/or the second sheet may have a thickness of 65 mil to 75 mil. In some embodiments, either or both of the first sheet and/or the second sheet may have a thickness of 70 mil to 75 mil.

In some embodiments, either or both of the first sheet and/or the second sheet may have a thickness of 40 mil to 70 mil. In some embodiments, either or both of the first sheet and/or the second sheet may have a thickness of 45 mil to 70 mil. In some embodiments, either or both of the first sheet and/or the second sheet may have a thickness of 50 mil to 70 mil. In some embodiments, either or both of the first sheet and/or the second sheet may have a thickness of 55 mil to 70 mil. In some embodiments, either or both of the first sheet and/or the second sheet may have a thickness of 60 mil to 70 mil. In some embodiments, either or both of the first sheet and/or the second sheet may have a thickness of 65 mil to 70 mil.

In some embodiments, either or both of the first sheet and/or the second sheet may have a thickness of 40 mil to 65 mil. In some embodiments, either or both of the first sheet and/or the second sheet may have a thickness of 45 mil to 65 mil. In some embodiments, either or both of the first sheet and/or the second sheet may have a thickness of 50 mil to 65 mil. In some embodiments, either or both of the first sheet and/or the second sheet may have a thickness of 55 mil to 65 mil. In some embodiments, either or both of the first sheet and/or the second sheet may have a thickness of 60 mil to 65 mil.

In some embodiments, either or both of the first sheet and/or the second sheet may have a thickness of 40 mil to 60 mil. In some embodiments, either or both of the first sheet and/or the second sheet may have a thickness of 45 mil to 60 mil. In some embodiments, either or both of the first sheet and/or the second sheet may have a thickness of 50 mil to 60 mil. In some embodiments, either or both of the first sheet and/or the second sheet may have a thickness of 55 mil to 60 mil.

In some embodiments, either or both of the first sheet and/or the second sheet may have a thickness of 40 mil to 55 mil. In some embodiments, either or both of the first sheet and/or the second sheet may have a thickness of 45 mil to 55 mil. In some embodiments, either or both of the first sheet and/or the second sheet may have a thickness of 50 mil to 55 mil.

In some embodiments, either or both of the first sheet and/or the second sheet may have a thickness of 40 mil to 50 mil. In some embodiments, either or both of the first sheet and/or the second sheet may have a thickness of 45 mil to 50 mil. In some embodiments, either or both of the first sheet and/or the second sheet may have a thickness of 45 mil to 50 mil.

In some embodiments, the compressing zone may be located downstream of the heating zone—that is, the first set of compressing rollers may be downstream of the hot air knife.

In some embodiments, the hot air knife may comprise a heater for heating air. In some embodiments, the hot air knife may comprise a blower. In some embodiments, the hot air knife may comprise an air outlet configured to direct the hot air to either or both of the first and/or second sheets.

In some embodiments, the hot air knife may heat the air to a temperature of at least 600° C. In some embodiments, the hot air knife may heat the air to a temperature of 600° C. In some embodiments, the hot air knife may heat the air to a temperature of more than 600° C. In some embodiments, the hot air knife may heat the air to a temperature of less than 600° C.

In some embodiments, the hot air knife may heat at least a portion of the width of at least one of the first and/or second sheet. In some embodiments, the hot air knife may heat at least a portion of the width of at least one of the first sheet and/or the second sheet with air at a temperature of at least 600° C. In some embodiments, the hot air knife may heat at least a portion of the width of at least one of the first sheet and/or the second sheet with air at a temperature of 600° C. In some embodiments, the hot air knife may heat at least a portion of the width of at least one of the first sheet and/or the second sheet with air at a temperature of more than 600° C. In some embodiments, the hot air knife may heat at least a portion of the width of at least one of the first sheet and/or the second sheet with air at a temperature of less than 600° C.

In some embodiments, the two compressing rollers may be adjacent to the hot air knife. In some embodiments, "adjacent" means that there is no other component between the compressing rollers and the hot air knife.

In some embodiments, rotation of the two compressing rollers may pull the first and/or second sheet through the heating zone and/or the compressing zone.

In some embodiments, the laminated roofing membrane may be cut into one or more laminated roofing strips. In some embodiments, the one or more laminated roofing strips may be 18 inches in length. In some embodiments, the one or more laminated roofing strips may be the width of the first and/or second sheets. In some embodiments, the one or more laminated roofing strips may be used to cover a roof deck of a building structure. In some embodiments, the one or more laminated roofing strips may be used to cover a steep slope roof deck. As used herein, a "steep slope" roof deck is a roof deck that is disposed on a roof having a pitch of Y/X, where Y and X are in a ratio of 4:12 to 20:12, where Y corresponds to the "rise" of the roof, and where X corresponds to the "run" of the roof. In some embodiments, the one or more laminated roofing strips may act as roofing shingles used to cover a steep slope roof deck.

In some embodiments, mechanical fasteners may be used to attach the one or more laminated roofing strips to the roof deck, such as by penetrating the laminated roofing strips and the roof deck above which the roofing strips are installed. In some embodiments, nails may be used to attach the one or more laminated roofing strips to the roof deck. In some embodiments, screws may be used to attach the one or more laminated roofing strips to the roof deck. In some embodiments, staples may be used to attach the one or more laminated roofing strips to the roof deck. In some embodiments, rivets may be used to attach the one or more laminated roofing strips to the roof deck. In some embodiments, an adhesive may be used to attach the one or more laminated roofing strips to the roof deck. In some embodiments, an underlayment may be disposed between the one or more laminated roofing strips and the roof deck.

In some embodiments, the laminated roofing membrane may be textured. In some embodiments, the laminated roofing membrane may be textured using at least one roller. In some embodiments, the laminated roofing membrane may be textured using a set of texturing rollers. In some embodiments, at least one roller of the set of texturing rollers may be a textured roller, and at least one roller of the set of texturing rollers may have an untextured surface. In some embodiments, both of the rollers of the set of texturing rollers may be textured. In some embodiments, the set of texturing rollers may be located downstream of the heating zone. In some embodiments, the set of texturing rollers may be located downstream of the compressing zone. In some embodiments, the set of texturing rollers may be located downstream of the heating zone and the compressing zone. In some embodiments, one or both of the texturing rollers may be heated rollers that reheat the laminated roofing membrane. In some embodiments, neither of the texturing rollers may be heated rollers. In some embodiments, a separate heater may reheat the laminated roofing membrane prior to and/or during the texturing. In some embodiments, another heat knife may reheat the laminated roofing membrane and/or one or more of the texturing rollers, prior to and/or during the texturing.

In some embodiments, the laminated roofing membrane may include a third sheet. In some embodiments, the third sheet may be the same as either or both of the first and/or second sheets. In some embodiments, the third sheet may be the different than either or both of the first and/or second sheets. In some embodiments, the third sheet may be heated by the hot air knife. In some embodiments, at least a portion of a width of the third sheet may be heated by the hot air knife. In some embodiments, an entire width of the third sheet may be heated by the hot air knife. In some embodiments, no portion of the width of the third sheet may be heated by the hot air knife. In some embodiments, the third sheet may be compressed with the first and second sheet, thereby to form the laminated roofing membrane.

In some embodiments, a third sheet may be laminated to the laminated roofing membrane formed by the first and second sheets, thereby to form a three-layer laminated roofing membrane. In some embodiments, the laminated roofing membrane and the third sheet may be compressed between another set of compressing rollers, thereby to form the three-layer laminated roofing membrane. In some embodiments, the third sheet may directly contact the laminated roofing membrane without a scrim layer disposed between the laminated roofing membrane and the third sheet, thereby to form the three-layer laminated roofing membrane.

In some embodiments, widths of any or all of the first, second, and/or third sheets are the same as another sheet or all of the sheets. In some embodiments, widths of any or all of the first, second, and/or third sheets are different that another sheet or all of the sheets.

In some embodiments, the three-layer laminated roofing membrane may be textured with a set of texturing rollers. In some embodiments, the set of texturing rollers may be the as described herein. In some embodiments, the set of texturing rollers may be disposed downstream of the heating zone, the compressing zone, and the second set of compressing rollers. In some embodiments, the textured three-layer laminated roofing membrane may be cut into roofing strips. In some embodiments, the roofing strips may be used as discussed herein.

With reference to the figures, FIG. 1 is an isometric view of a system 100, in accordance with some embodiments of the invention. As shown in the figure, in some embodiments, the system 100 may use a first roll of a first sheet 10. The first sheet 10 may be in accordance with any sheet described here. In some embodiments, the first sheet 10 may be in accordance with the first sheet described herein. In some embodiments, the system 100 may also use a second roll of a second sheet 20. The second sheet 20 may be in accordance with any sheet described here. In some embodiments, the second sheet 20 may be in accordance with the second sheet described herein. Although the figures show each of the first sheet 10 and the second sheet 20 on a separate roll, in some embodiments either or both of the sheets may not be on a roll or rolls.

As shown in FIG. 1, in some embodiments, the system 100 may include a hot air knife 30. In some embodiments, the hot air knife 30 may be in accordance with the hot air knife further described herein. In some embodiments, the hot air knife 30 may heat at least a portion of a width of the first sheet 10 with hot air, thereby to form a heated first sheet. In some embodiments, the hot air knife 30 directs hot air toward at least one surface of the first sheet 10. In some embodiments, the hot air knife 30 may heat only a portion of the width of the first sheet 10 with hot air, as described above. In some embodiments, the hot air knife 30 may heat an entirety of the width of the first sheet 10 with hot air, as described above. In some embodiments, the hot air knife 30 directs hot air toward at least one surface of the second sheet 20. In some embodiments, the hot air knife 30 may heat only a portion of the width of the second sheet 20 with hot air, as described. In some embodiments, the hot air knife 30 may heat an entirety of the width of the second sheet 20 with hot air, as described. In some embodiments, the hot air knife 30 may heat only a portion of the width of the first sheet 10 with hot air and only a portion of the width of the second sheet 20 with hot air. In some embodiments, the hot air knife 30 may heat only a portion of the width of the first sheet 10 with hot air and an entirety of the width of the second sheet 20 with hot air. In some embodiments, the hot air knife 30 may heat the entirety of the width of the first sheet 10 with hot air and only a portion of the width of the second sheet 20 with hot air.

In some embodiments, the location at which the hot air knife 30 heats either or both of the first sheet 10 and/or the second sheet 20 may be referred to as a heating zone. In some embodiments, the location at which the hot air knife 30 is located may be referred to as a heating zone. In some embodiments, the location at which the hot air knife 30 heats either or both of the first sheet 10 and/or the second sheet 20 and at which the hot air knife 30 is located may be referred to as a heating zone.

In some embodiments, either or both of the first sheet 10 and/or the second sheet 20 may undergo no other heating prior to heating by the hot air knife 30. In some embodiments, either or both of the first sheet 10 and/or the second sheet 20 may undergo no other heating subsequent to heating by the hot air knife 30. In some embodiments, either or both of the first sheet 10 and/or the second sheet 20 may undergo no other heating prior and subsequent to heating by the hot air knife 30—that is, the only heating either or both of the first sheet 10 and/or the second sheet 20 may undergo may be heating by the hot air knife 30.

As shown in FIG. 1, the system 100 may include a set of compressing rollers 40. In some embodiments, the set of compressing rollers may include two compressing rollers 40. In some embodiments, the compressing rollers 40 may compress the heated first sheet 10 with the second sheet 20, thereby to form a laminated roofing membrane 50. In some embodiments, the compressing rollers 40 may compress the heated first sheet 10 with the heated second sheet 20, thereby to form the laminated roofing membrane 50. In some embodiments, the compressing rollers 40 may compress the first sheet 10 with the heated second sheet 20, thereby to form the laminated roofing membrane 50. In some embodiments, the location where the set of compressing rollers 40 are located may be referred to as the compressing zone.

As shown in the figure, the set of compressing rollers 40 and the hot air knife 30 may be disposed adjacent one another, as described herein.

As shown in the figure, the first sheet 10 and the second sheet 20 may directly contact one another—that is, there may be no intervening layer disposed between the first sheet 10 and the second sheet 20, such as, for example, a scrim layer.

As discussed herein, in some embodiments, the laminated roofing membrane 50 may be cut into lengths, thereby to form one or more laminated roofing strips. In some embodiments, the one or more laminated roofing strips may be as described herein. In some embodiments, the one or more laminated roofing strips may be used to cover a roof deck, such as a steep slope roof deck, as described herein.

Figure 2:
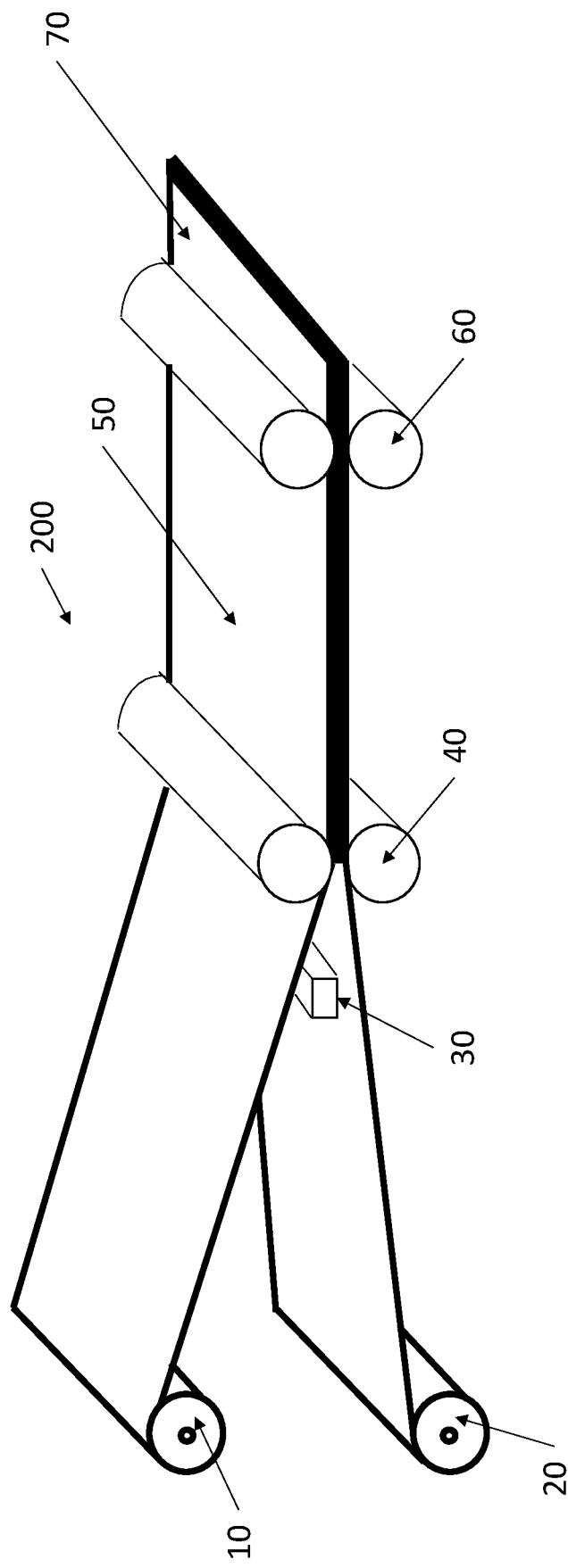
FIG. 2 is an isometric view of another system in accordance with some embodiments of the invention.

FIG. 2 is an isometric view of a system 200 in accordance with some embodiments of the invention. In some embodiments, the system 200 may differ from system 100 in that system 200 may include a set of texturing rollers 60. In some embodiments, the set of texturing rollers may be two texturing rollers 60. In some embodiments, the texturing rollers 60 may texture one or both sides of the laminated roofing membrane 50, thereby to form a textured laminated roofing membrane 70. In some embodiments, only one of the texturing rollers 60 may have a textured surface to thereby texture one side of the laminated roofing membrane 50, while the other roller 60 has a nontextured surface. In some embodiments, both texturing rollers 60 may have a textured surface for texturing the laminated roofing membrane 50. In some embodiments, the location where the set of texturing rollers 60 are located may be referred to as the texturing zone.

As discussed herein, in some embodiments, the textured laminated roofing membrane 70 may be cut into lengths, thereby to form one or more textured laminated roofing strips. In some embodiments, the one or more textured laminated roofing strips may be as described herein. In some embodiments, the one or more textured laminated roofing strips may be used to cover a roof deck, such as a steep slope roof deck, as described herein.

Figure 3:
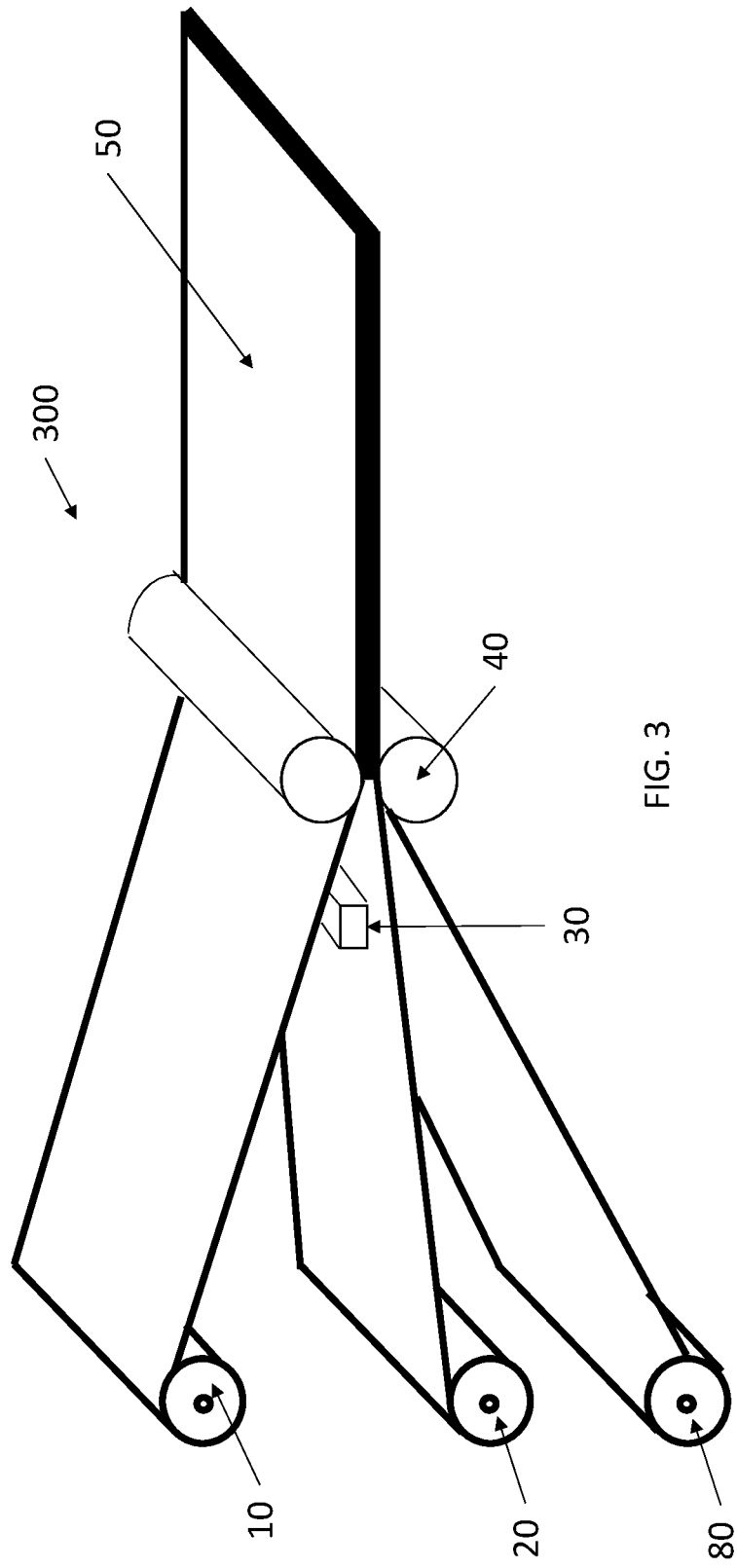
FIG. 3 is an isometric view of another system in accordance with some embodiments of the invention.

FIG. 3 is an isometric view of a system 300 in accordance with some embodiments of the invention. In some embodiments, the system 300 may differ from systems 100 and 200 in that system 300 may include a third roll of a third sheet 80, to thereby form the laminated roofing membrane 50. In some embodiments, the hot air knife 30 may heat at least a portion of a width of the first sheet 10 with hot air, thereby to form a heated first sheet 10. In some embodiments, the hot air knife 30 may direct hot air toward at least one surface of the first sheet 10. In some embodiments, the hot air knife 30 may heat only a portion of the width of the first sheet 10 with hot air. In some embodiments, the hot air knife 30 may heat an entirety of the width of the first sheet 10 with hot air. In some embodiments, the hot air knife 30 may direct hot air toward at least one surface of the second sheet 20, thereby to form the heated second sheet 20. In some embodiments, the hot air knife 30 may heat only a portion of the width of the second sheet 20 with hot air. In some embodiments, the hot air knife 30 may heat an entirety of the width of the second sheet 20 with hot air. In some embodiments, the hot air knife 30 may heat only a portion of the width of the first sheet 10 with hot air and only a portion of the width of the second sheet 20 with hot air. In some embodiments, the hot air knife 30 may heat only a portion of the width of the first sheet 10 with hot air and an entirety of the width of the second sheet 20 with hot air. In some embodiments, the hot air knife 30 may heat the entirety of the width of the first sheet 10 with hot air and only a portion of the width of the second sheet 20 with hot air. In some embodiments, the system 300 may include another heater, such as another hot air knife, that may heat a surface of the third sheet 80.

As shown in FIG. 3, the system 300 may include the set of compressing rollers 40. In some embodiments, the compressing rollers 40 may compress the heated first sheet 10 with the second sheet 20 and the third sheet 80, thereby to form the laminated roofing membrane 50. In some embodiments, the compressing rollers 40 may compress the heated first sheet 10 with the heated second sheet 20 and with the third sheet 80, thereby to form the laminated roofing membrane 50. In some embodiments, the compressing rollers 40 may compress the first sheet 10 and the third sheet 80 with the heated second sheet 20, thereby to form the laminated roofing membrane 50.

In some embodiments, the laminated roofing membrane 50 may be cut into lengths, thereby to form one or more laminated roofing strips, in accordance with the discussion herein. In some embodiments, the one or more laminated roofing strips may be as described herein. In some embodiments, the one or more laminated roofing strips may be used to cover a roof deck, such as a steep slope roof deck, as described herein.

In some embodiments, the laminated roofing membrane 50 may be textured, such as by a set of texturing rollers, as described herein.

Figure 4:
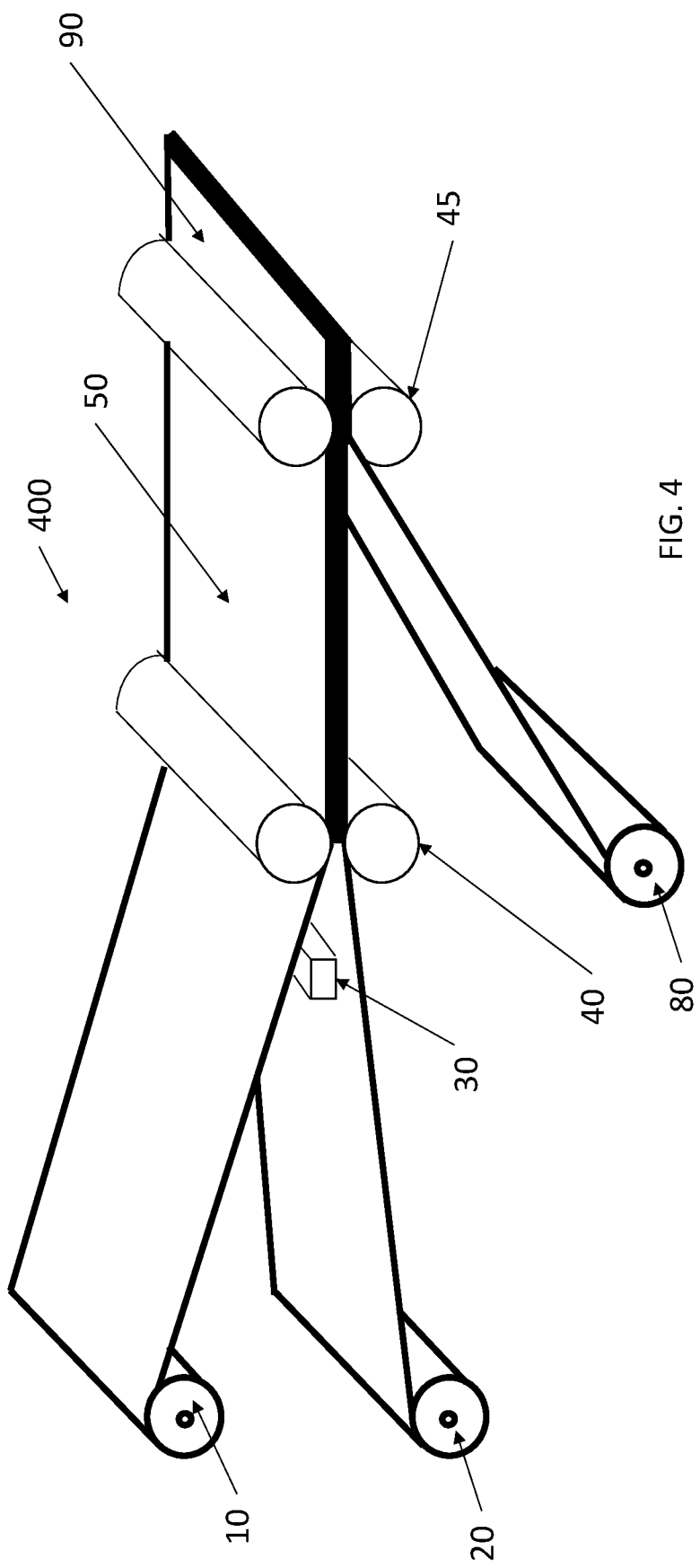
FIG. 4 is an isometric view of another system in accordance with some embodiments of the invention.

FIG. 4 is an isometric view of a system 400 in accordance with some embodiments of the invention. In some embodiments, the system 400 may differ from systems 100, 200, and 300 in that system 400 may include a second set of compressing rollers 45. In some embodiments, the compressing rollers 45 may compress the laminated roofing membrane 50, which is a two-layer laminated membrane, and the third sheet 80, thereby to form a three-layer laminated roofing membrane 90.

In some embodiments, the three-layer laminated roofing membrane 90 may be cut into lengths, thereby to form one or more three-layer laminated roofing strips, in accordance with the discussion herein. In some embodiments, the one or more three-layer laminated roofing strips may be as described herein. In some embodiments, the one or more three-layer laminated roofing strips may be used to cover a roof deck, such as a steep slope roof deck, as described herein.

In some embodiments, the three-layer laminated roofing membrane 90 may be textured, such as by a set of texturing rollers, as described herein.

In some embodiments, any of the laminated roofing membranes and/or laminated roofing strips of the invention may have matte (e.g., non-shiny) outer surfaces, indicating that no heating of the outer surfaces of any of the first, second, and/or third sheets has occurred.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method, comprising:
    obtaining a first roll of a first sheet,
        wherein the first sheet comprises thermoplastic polyolefin (TPO), and
        wherein the first sheet has a width of at least 60 inches measured parallel to an axis of the first roll of the first sheet;
    obtaining a second roll of a second sheet,
        wherein the second sheet comprises thermoplastic polyolefin (TPO), and
        wherein the second sheet has a width of at least 60 inches measured parallel to
        an axis of the second roll of the second sheet;
    heating at least a portion of a width of the first sheet with hot air from a hot air knife, thereby to form a heated first sheet;
    compressing the heated first sheet and the second sheet with one another between two rollers, thereby to form a laminated roofing membrane,
        wherein the heated first sheet and the second sheet directly contact one another without any intervening layer disposed between the heated first sheet and the second sheet
        wherein the hot air knife is adjacent to the two rollers; and
    cutting the laminated roofing membrane, thereby forming a separate first laminated roofing shingle.

2. The method of claim 1, wherein the hot air knife heats an entirety of the width of the first sheet.

3. The method of claim 2, wherein the hot air knife heats the entire width of the first sheet with the hot air at a temperature of at least 600° C.

4. The method of claim 1, wherein the heating further comprises heating at least a portion of the width of the second sheet with the hot air from the hot air knife, thereby to form a heated second sheet, and
    wherein the compressing further comprises compressing the heated first sheet and the heated second sheet with one another between the two rollers.

5. The method of claim 1, wherein the widths of the first sheet and the second sheet are the same, and each of the widths is 60 inches to 120 inches.

6. The method of claim 1, wherein at least one of the first sheet and the second sheet has a thickness of 80 mils.

7. The method of claim 1, further comprising:
    prior to cutting, texturing the laminated roofing membrane.

8. The method of claim 7, wherein the texturing comprises using at least one texturing roller to texture the laminated roofing membrane
    wherein the at least one texturing roller is a heated roller that reheats the laminated roofing membrane.

9. The method of claim 1, wherein neither the first sheet nor the second sheet is heated prior to the heating of the at least a portion of the width of the first sheet with the hot air knife.

10. The method of claim 1, wherein there is no adhesive between the heated first sheet and the second sheet.

11. A method comprising:
    obtaining a first roll of a first sheet,
        wherein the first sheet comprises thermoplastic polyolefin (TPO), and
        wherein the first sheet has a width of at least 60 inches measured parallel to an axis of the first roll of the first sheet;
    obtaining a second roll of a second sheet,
        wherein the second sheet comprises thermoplastic polyolefin (TPO), and
        wherein the second sheet has a width of at least 60 inches measured parallel to an axis of the second roll of the second sheet;
    obtaining a third roll of a third sheet,
    wherein the third sheet comprises thermoplastic polyolefin (TPO), and
        wherein the third sheet has a width of at least 60 inches measured parallel to an axis of the third roll of the third sheet;
    heating at least a portion of a width of the first sheet with hot air from a hot air knife, thereby to form a heated first sheet;
    compressing the heated first sheet, the second sheet, and the third sheet with one another between two rollers, thereby to form a laminated roofing membrane, wherein the first and second sheets directly contact one another without any intervening layer therebetween, and wherein the second and third sheets directly contact one another without any intervening layer therebetween;

wherein the hot air knife is adjacent to the two rollers; and cutting the laminated roofing membrane, thereby forming a separate first laminated roofing shingle.

12. The method of claim 11, further comprising:

prior to cutting, texturing the laminated roofing membrane.

13. A method comprising:

obtaining a first roll of a first sheet,
- wherein the first sheet comprises thermoplastic polyolefin (TPO), and
- wherein the first sheet has a width of at least 60 inches measured parallel to an axis of the first roll of the first sheet;

obtaining a second roll of a second sheet,
- wherein the second sheet comprises thermoplastic polyolefin (TPO), and
- wherein the second sheet has a width of at least 60 inches measured parallel to an axis of the second roll of the second sheet;

obtaining a third roll of a third sheet,
- wherein the third sheet comprises thermoplastic polyolefin (TPO), and
- wherein the third sheet has a width of at least 60 inches measured parallel to an axis of the third roll of the third sheet;

heating at least a portion of a width of the first sheet with hot air from a hot air knife, thereby to form a heated first sheet; and compressing the heated first sheet and the second sheet with one another between two rollers, thereby to form a two-layer laminated membrane,
- wherein the first and second sheets directly contact one another without any intervening layer therebetween;

compressing the two-layer laminated membrane and the third sheet with one another, thereby to form a three-layer laminated roofing membrane,
- wherein the second and third sheets directly contact one another without any intervening layer therebetween
- wherein the hot air knife is adjacent to the two rollers; and cutting the three-layer laminated roofing membrane, thereby forming a separate first laminated roofing shingle.

14. The method of claim 13, wherein the third sheet is not heated prior to the compressing the two-layer laminated membrane and the third sheet.

15. The method of claim 13, wherein the third sheet is heated prior to the compressing the two-layer laminated membrane and the third sheet.

* * * * *